Feb. 20, 1968 R. L. RISBERG 3,370,178

PULSE REGISTERING AND SHIFTING SYSTEM OF THE MODIFIED RING COUNTER TYPE

Filed July 13, 1964 3 Sheets-Sheet 1

United States Patent Office 3,370,178
Patented Feb. 20, 1968

3,370,178
PULSE REGISTERING AND SHIFTING SYSTEM OF THE MODIFIED RING COUNTER TYPE

Robert L. Risberg, Milwaukee, Wis., assignor to Cutler-Hammer, Inc., Milwaukee, Wis., a corporation of Delaware Filed July 13, 1964, Ser. No. 382,270
16 Claims. (Cl. 307—223)

ABSTRACT OF THE DISCLOSURE

A solid state ring counter of the pulse-triggered anode-commutated type having semi-conductor devices connected in sequence and a single input for sequential D.C. pulses and being modified to provide first to fourth, second to fifth and third to sixth commutation of the successively connected semi-conductor devices to insure conduction of three semi-conductor devices at all times to provide a plurality of output signals each having 180 degree square wave pulses separated by 180 degree off periods, the respective signals of first and second groups thereof being displaced 180 degrees and the signals of the first group being in overlapping sequential relation with a phase displacement of 120 degrees, and a starting circuit responsive to connection of supply voltage to initiate an output signal to condition the counter for operation and inhibiting circuits between successive semi-conductor devices to insure steering of each input pulse to the next succeeding semi-conductor device to be controlled.

Figure 1:
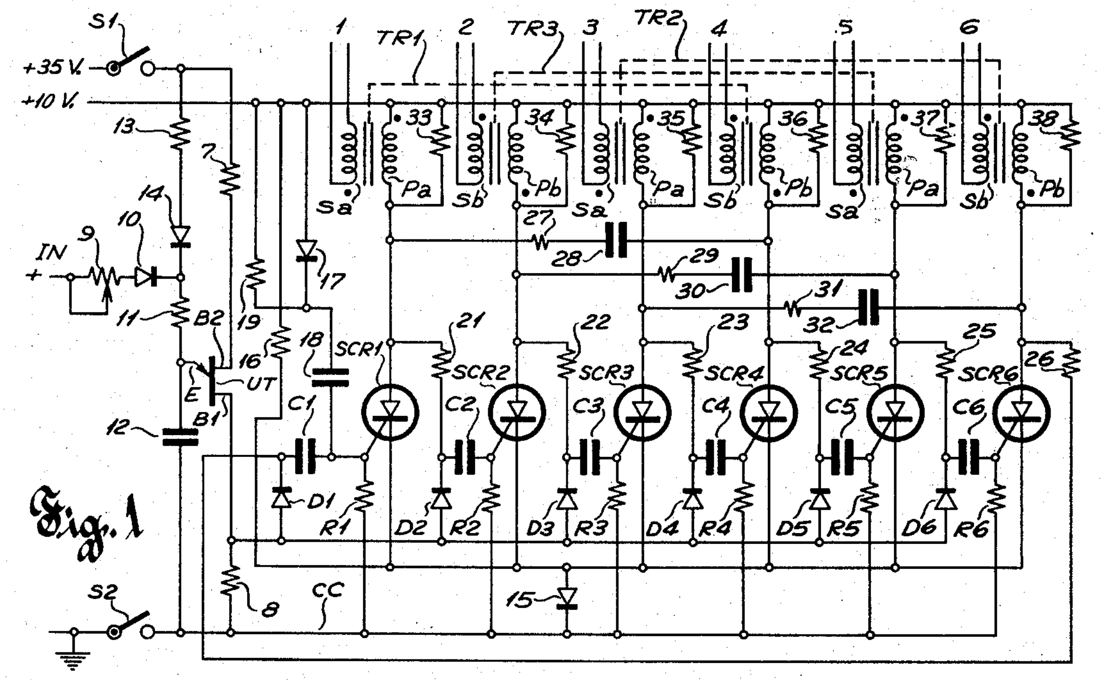

This invention relates to pulse registering and shifting systems and more particularly to solid state shift registers of the ring type.

While not limited thereto, the invention is especially applicable to controlling plural-phase inverters such as is disclosed in R. L. Riseberg copending application Serial No. 381,970, filed July 13, 1964, now Patent No. 3,344,-326, dated Sept. 26, 1967; and assigned to the assignee of this invention.

An object of the invention is to provide an improved pulse registering and shifting system.

A more specific object of the invention is to provide a solid state shift register of the ring type which is simple and economical in construction and reliable in operation.

Another specific object of the invention is to provide a solid state control circuit having a single input terminal and a plurality of output terminals arranged in closed sequence and means responsive to successive pulses at the input terminal for providing output signals at a group of output terminals and for shifting the group of output signals around the closed sequence of output terminals such that each time an output signal is provided at another output terminal the output signal which has been provided the longest is terminated.

Another specific object of the invention is to provide an improved silicon controlled rectifier (SCR) shift register of the ring type which sequentially provides six positive output voltages, three at a time, and which requires only three commutation capacitors connected between the anodes of the first and fourth, the second and fifth and the third and sixth SCR's.

Another specific object of the invention is to provide an improved shift register of the ring type especially adapted for supplying firing pulses to a three-phase controlled rectifier inverter of the bridge type.

Another specific object of the invention is to provide an improved and simplified digital pulse generator for providing three-phase output signals wherein each output signal has 180 degree "on" periods spaced by 160 degree "off" bias periods and the "on" periods of the different output signals have a phase displacement of 120 degrees.

Another specific object of the invention is to provide an improved digital pulse generator of the aforementioned type wherein the 180 degree "on" periods are square-wave positive pulses and the 180 degree "off" bias periods are square-wave negative pulses.

Another specific object of the invention is to provide an improved digital pulse generator of the aforementioned type employing solid state devices as the active elements.

A further specific object of the invention is to provide an improved digital pulse generator for providing six output signals, each having square-wave pulses 180 degrees in length spaced 180 degrees apart, the pulses of three of said signals having a phase-displacement of 120 degrees relative to one another, and the pulses of the other three of said signals having a phase-displacement of 180 degrees with the pulses of the first three signals, respectively.

Another specific object of the invention is to provide a solid state shift register with improved operating means whereby each input pulse is applied only to one solid state element.

Another specific object of the invention is to provide a solid state shift register of the ring type with means for initially turning on half of the solid state elements in response to connection of supply voltage thereto.

Other objects and advantages of the invention will hereinafter appear.

According to the invention, there is provided a unijuntion transistor oscillator or pulse generator supplied from a D.C. source for providing output pulses in accordance with the magnitude of an input D.C. voltage and the timing of an RC circuit. If desired, the oscillator input may be connected to the D.C. source to establish a minimum frequency for the output pulses from which their frequency can be increased with an adjustable D.C. input signal. The output pulses of adjustable frequency are applied to a digital plural output shift register of the ring type for control purposes. The shift register comprises an even number of SCR's (silicon controlled rectifiers) each being controlled by a normally inhibited capacitor-diode circuit and each having one-half of an output transformer or the like to provide an output voltage. The uninhibiting means for the capacitor-diode circuit of each SCR is the anode of the immediately preceding SCR in the ring in its operating condition except that means are provided for initiating operation of the system in response to connection of supply voltage by bypassing the inhibited capacitor-diode circuit of the first SCR. The shift register is provided with means for maintaining one-half of the SCR's conducting at a time and for shifting the three conducting SCR's in response to each input pulse. For this purpose, in a first form having six SCR's the anodes of the fourth, fifth and sixth SCR's are coupled through commutating capacitors to the anodes of the first, second and third SCR's, respectively.

A modification of the shift register comprises twelve SCR's. In this modification, initial gating means are provided for firing the first six of the twelve SCR's initially when supply power is connected. The input pulses from the relaxation oscillator then shift the conduction of one SCR at a time. This modification is also provided with means for inhibiting all of the SCR's except the next one to be fired. This reduces the current load on the oscillator over systems wherein a number of the conducting SCR's in addition to the first non-conducting SCR remain uninhibited as in FIG. 1.

Figure 2:
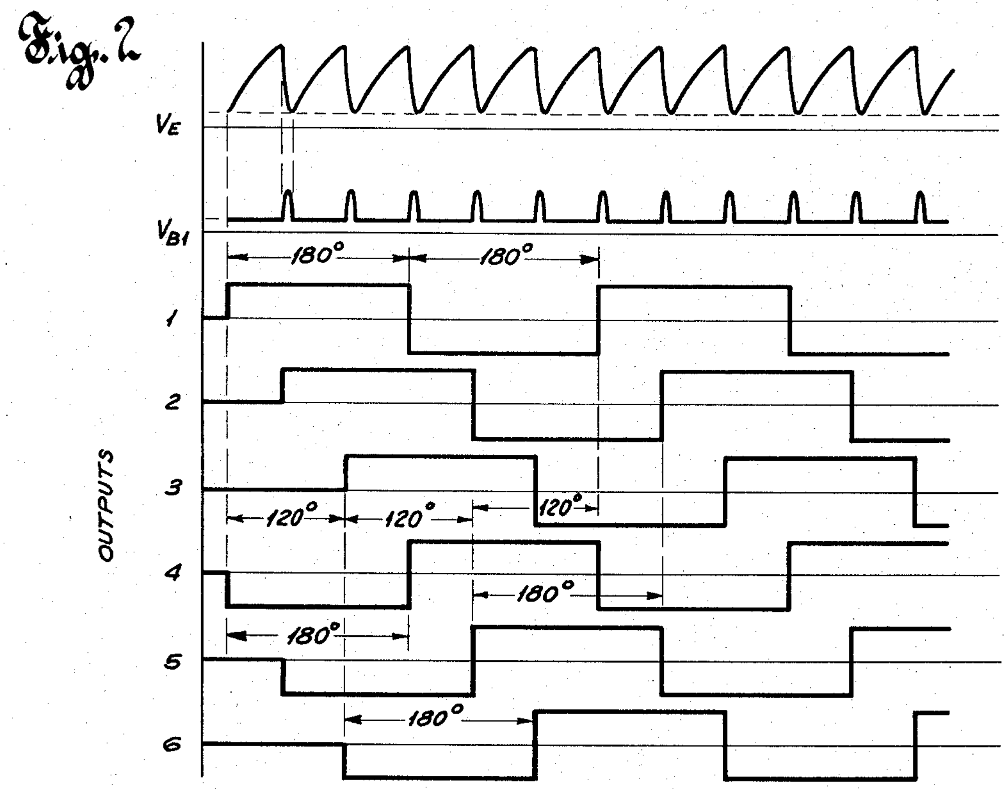
Figure 3A:
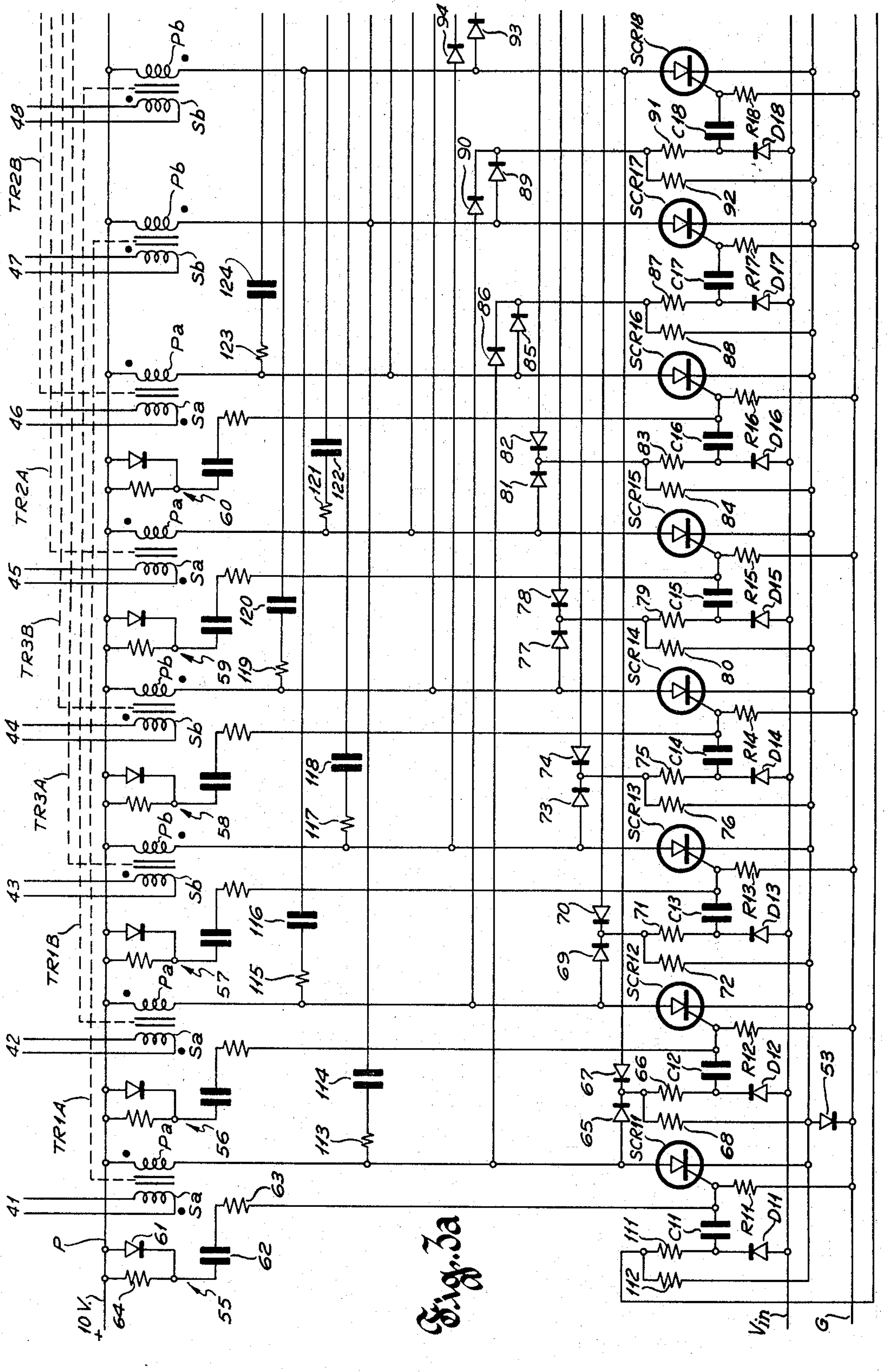
Figure 4:
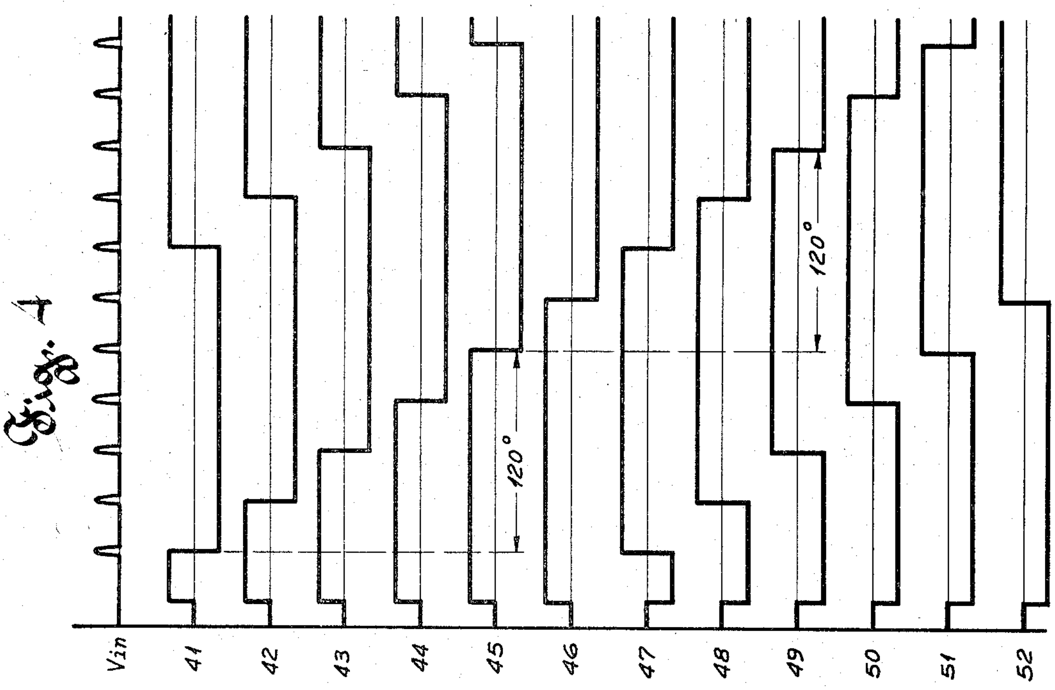
Figure 3B:
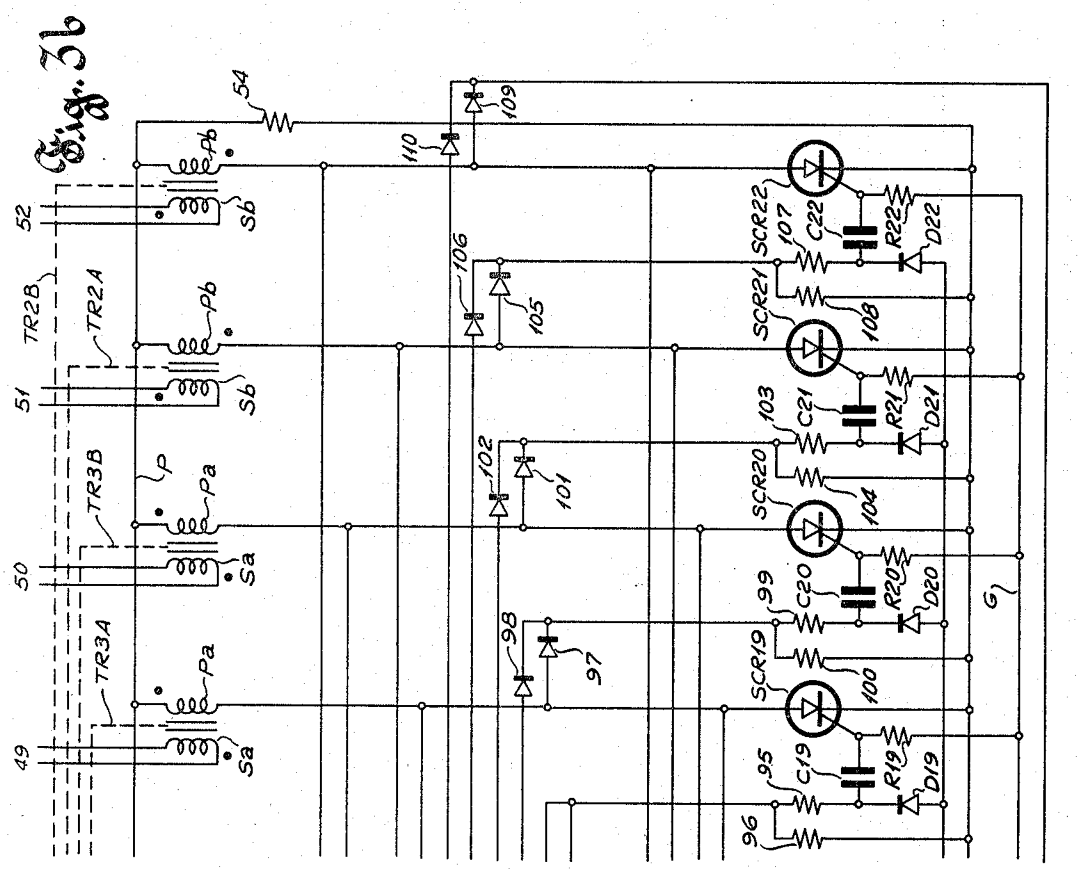

These and other objects and advantages of the invention and the manner of obtaining them will best be understood by reference to the following description of embodiments of pulse registering and shifting systems taken in conjunction with the accompanying drawings, wherein:

FIGURE 1 is a circuit diagram of an oscillator and a pulse registering and shifting system constructed in accordance with the invention;

FIG. 2 graphically depicts operating characteristics of the system of FIG. 1;

FIGS. 3*a* and 3*b* show a circuit diagram of a modification of the system of FIG. 1 having a larger number of SCR's; and FIG. 4 graphically depicts operating characteristics of the system of FIGS. 3*a* and 3*b*.

Referring to FIG. 1, there is shown an SCR shift register of the ring type having a single input and six outputs 1–6 and controlled by a unijunction oscillator or pulse generator of the relaxation type. The oscillator is provided with a unijunction transistor UT as the active element. A positive unidirectional voltage source of 35 volts or the like is connected through a switch contact S1 and a temperature compensating resistor 7 to base B2 of the transistor. Base B1 is connected through a load resistor 8 and switch contact S2 to ground potential. While switch contacts S1 and S2 have been shown for connecting supply voltage to the transistor, it will be apparent that static switching means such as solid state switching devices could be used in place thereof.

Input terminal IN is connected through an adjustable resistor 9, a unidirectional conducting device such as a diode 10, a resistor 11 and a capacitor 12 to common conductor CC at the junction between switch contact S2 and resistor 8. The junction between resistor 11 and capacitor 12 is connected to emitter E of unijunction transistor UT. The input circuit just described including resistors 9 and 11 and capacitor 12 forms an RC timing circuit which in conjunction with the magnitude of the input voltage determines the frequency of the oscillator output pulses.

The oscillator may be provided with means for establishing a minimum frequency for its output. This means comprises a connection from the positive 35 volt supply through switch contact S1 and a resistor 13 and a unidirectional diode 14 to the junction between diode 10 and resistor 11 for supplying current to capacitor 12.

The shift register comprises a single input taken from across load resistor 8 and the six outputs 1–6 are arranged to provide digital output signals, three at a time. As shown in FIG. 1, the shift register comprises six SCR's designated SCR1 through SCR6. The anodes of these SCR's are supplied from a unidirectional voltage source of positive 10 volts or the like through halves of center-tapped primary windings of output transformers TR1, TR2, and TR3. The cathodes of these SCR's are connected to one another and then through a biasing diode 15 to common conductor CC. The junction between these cathodes and diode 15 is supplied with biasing voltage from the positive 10 volt source through a resistor 16. Transformers TR1–3 are provided with pairs of secondary windings connected to outputs 1–6 of the shift register. As indicated by the broken lines in FIG. 1, the two sets of windings, P*a*, S*a* and P*b*, S*b* of transformer TR1 are wound side-by-side on the same magnetic core, the two sets of windings P*a*, S*a* and P*b*, S*b* of transformer TR3 similarly have a common core, and the two sets of windings P*a*, S*a* and P*b*, S*b* of transformer TR2 likewise have a common core. With this arrangement, when one set of windings provides a positive voltage "on" signal, the associated set of windings provides a negative voltage "off" bias.

The shift register is provided with initial gating means for initiating operation thereof when supply voltage is connected thereto. This means, which is a pulsing circuit comprises a unidirectionally conducting diode 17 and a capacitor 18 connected in series from the positive 10 volt source to the gate of one of the SCR's such as SCR1, there being a resistor 19 connected across diode 17.

Each SCR in the shift register is provided with a capacitor-diode gating circuit for controlling the same. Each such capacitor-diode circuit comprises a diode, a capacitor and a resistor. For example, the circuit for SCR1 comprises a diode D1, a capacitor C1 and a resistor R1. The corresponding elements of the other capacitor-diode circuits are similarly designated D, C and R, each followed by the numeral of the corresponding SCR.

Base B1 of unijunction transistor UT is connected through diode D1 and capacitor C1 to the gate of SCR1. Base B1 is similarly connected in parallel through similar diodes and capacitors to the gates of the other SCR's. The gate of SCR1 is connected through resistor R1 to common conductor CC. The gates of the other SCR's are connected through similar resistors R2 to R6, respectively, to the common conductor.

The anode of each SCR is connected through a resistor to the capacitor-diode circuit of the succeeding SCR to apply inhibiting and uninhibiting controls thereto as hereinafter described. For this purpose, resistor 21 connects the anode of SCR1 to the cathode of diode D2. In a similar manner, resistors 22–25 connect the anodes of SCR2–SCR5 to the capacitor-diode circuits of respectively succeeding SCR's. And resistor 26 in like manner connects the anode of SCR6 to the capacitor-diode circuit of SCR1 to form a ring.

To control commutation of the SCR's in a predetermined order, a small resistor 27 and a commutating capacitor 28 are connected in series between the anodes of SCR1 and SCR4, a small resistor 29 and a commutating capacitor 30 are connected in series between the anodes of SCR2 and SCR5 and a small resistor 31 and a commutating capacitor 32 are connected in series between the anodes of SCR3 and SCR6.

Resistors 33 through 38 are connected across the primary winding halves of output transformers TR1, TR2 and TR3 to provide a small auxiliary resistive load to improve the quality of the output voltage square wave.

The system of FIG. 1 will now be described with reference to the operating characteristics thereof graphically shown in FIG. 2.

Switch contacts S1 and S2 which may be pilot SCR's turned on with a pulse transformer or the like are closed to initiate operation of the system. Closure of these contacts causes the relaxation oscillator to start operating. Interbase voltage for unijunction transistor UT of the oscillator is supplied from the positive 35 volt source through contact S1 and resistor 7 to base B2 while base B1 is connected through resistor 8 and contact S2 to ground.

The circuit from the positive 35 volt source to the emitter of the unijunction transistor determines the minimum frequency of the oscillator. Current flows from the positive 35 volt source through contact S1, resistor 13, diode 14, resistor 11, capacitor 12 and contact S2 to ground to charge the capacitor. This current charges capacitor 12 in a predetermined time to establish the minimum frequency which can be increased by the input signal as desired.

One of the SCR's such as SCR1 is provided with an initial gating circuit to turn it on in response to application of supply voltage to the system. When contact S2 is closed as aforesaid, a 10 volt positive going voltage is applied to the gate of SCR1. This voltage is applied by current flow from the positive 10 volt source through diode 17, capacitor 18, resistor R1 and contact S2 to ground. The initial near 10 volt drop on resistor R1 due to such current flow is applied to the gate-cathode circuit of SCR1 to render this silicon controlled rectifier conducting and to provide a positive voltage "on" output at terminals 1 shown by curve 1 in FIG. 2 and a negative voltage "off" bias at terminals 4 shown by curve 4 therein.

When contact S2 closes are aforesaid, the gates of the other SCR's receive a small step of voltage of about 0.4 volt. For example, current flowing from the plus 10 volt source through resistor 33 and primary winding P*a* of transformer TR1 in parallel, resistor 21, capacitor C2, resistor R2 and contact S2 to ground causes a small voltage of about 0.4 volt to be applied to the gate of SCR2. Diode 15 and resistor 16 are provided to insure that no SCR other than SCR1 will turn on when the switch contacts are closed. The current flowing through resistor 16 and diode 15 provides a voltage drop on diode 15 to apply a reverse bias of about 0.6 volt on the cathodes of all the SCR's so that none of them will be turned on except the intended one.

Before SCR1 was fired, positive voltage was applied from the 10 volt source through resistor 33 and primary winding P*a* of transformer TR1 and resistor 21 to the cathode of diode D2 to block or inhibit this diode. However, when SCR1 is rendered conducting, near ground potential is applied from the anode thereof through resistor 21 to the cathode of diode D2. In other words, the capacitor-diode circuits of the SCR's are initially inhibited by reverse voltage on the diodes and each SCR upon being rendered conducting removes the inhibiting voltage from the capacitor-diode circuit of the succeeding SCR as hereinafter described in more detail.

An input signal voltage at terminal IN causes current flow through resistor 9, diode 10, resistor 11, capacitor 12 and contact S2 to ground. This current in conjunction with the minimum frequency current hereinbefore described causes capacitor 12 to charge as shown by curve $V_E$ in FIG. 2. When capacitor 12 charges to the peak emitter value of unijunction transistor UT, the latter fires to discharge the capacitor by current flow through emitter E and base B1 and resistor 8.

The current flowing from base B1 flows partly through diode D2 and capacitor C2 to the gate of SCR2 since all other SCR's are inhibited and this is the only one that is not inhibited. This first pulse of current from the oscillator fires SCR2 to provide a positive voltage at output conductors 2 as shown by curve 2 in FIG. 2 and to provide a negative voltage "off" bias at output conductors 5 as shown by curve 5 therein.

Emitter voltage $V_E$ of the unijunction transistor is shown at the top of FIG. 2. It will be apparent that this emitter voltage changes in accordance with the charging and discharging of capacitor 12.

Base B1 voltage $V_{B1}$ shown in FIG. 2 comprises the voltage pulses produced on resistor 8 when capacitor 12 discharges following each charging thereof. This voltage pulse causes current flow from base B1 through diode D2 and capacitor C2 to the gate to fire the associated SCR2. This current pulse passes through diode D2 because near ground potential is being applied from the anode of SCR1 through resistor 21 to unblock diode D2. This voltage pulse $V_{B1}$ is also applied to diodes D1 and D3 to D6. However, positive voltage is being applied from the anodes of SCR2–SCR6 to block diodes D3 to D6 and D1, respectively, thereby to inhibit the capacitor-diode circuits of SCR3 to SCR6 and SCR1. However, SCR1 is already conducting so that it remains conducting.

When the first pulse fires SCR2 to start it conducting, its anode switches to near ground potential. As a result, the voltage on the cathode of diode D3 changes from positive to near ground potential to uninhibit this capacitor-diode circuit into readiness for receiving the next input pulse. In this manner, when each SCR is fired, it uninhibits the capacitor-diode circuit of the next SCR.

The second pulse of current from the oscillator is applied to the gates of SCR2 and SCR3 since their capacitor-diode circuits are not inhibited. Since SCR2 is already conducting, this pulse fires SCR3.

At the end of the second pulse, SCR1, SCR2 and SCR3 are conducting to provide positive voltages at outputs 1, 2 and 3 as indicated in FIG. 2. The third input pulse causes commutation. When the third pulse from the oscillator fires SCR4, the latter turns SCR1 off as hereinafter described, so that SCR2, SCR3 and SCR4 remain conducting.

Before SCR4 was fired, capacitor 28 was charged by current flow from the positive 10 volt source through resistor 36 and primary winding P*b* of transformer TR1 in parallel, resistor 27, SCR1, diode 15, conductor CC and contact S2. When SCR4 is fired, the right side of capacitor 28 drops from 10 volts positive to near ground potential. Since capacitor 28 cannot discharge instantaneously, the left side thereof drops from near ground potential to negative. This negative voltage at the anode causes SCR1 to be turned off.

Commutating capacitors 30 and 32 also charge when SCR2 and SCR3 conduct. When the next oscillator pulse fires SCR5, capacitor 30 turns SCR2 off. In this manner, each succeeding pulse from the oscillator fires the next SCR and the commutating capacitor turns off the SCR which has been "on" the longest so that three SCR's are always conducting. As a result, the system always provides three positive voltage outputs and three negative voltage outputs from the six pairs of output terminals and the oscillator pulses progressively shift the output voltages around the ring of output terminals.

As shown in FIG. 2, the six outputs 1–6 comprise two sets of outputs having certain relative characteristics. The voltages in outputs 1, 3 and 5 in the first set have a phase-displacement of 120 degrees relative to another. The voltages in outputs 2, 4 and 6 in the second set have a phase displacement of 180 degrees with the voltages in outputs 5, 1 and 3, respectively, of the first set.

From the foregoing, it will be apparent that the invention is especially useful for controlling a three-phase inverter or the like wherein three SCR's must be turned on at any time.

When the input voltage is increased in magnitude so that it exceeds the voltage applied to the unijunction transistor from the 35 volt source, diode 14 blocks further current from the latter source. Then the input signal alone controls the frequency of the oscillator output current pulses. Increase or decrease in the input voltage proportionately increases or decreases the shifting frequency of the outputs.

Although a relaxation oscillator of the unijunction transistor type has been shown, it will be apparent that the shift register is usable with other types of input oscillators.

The shift register circuit shown in FIGS. 3*a* and 3*b* differs from the circuit hereinbefore described in that a larger number of SCR's are employed, half of the SCR's are rendered initially conducting in response to connection of supply voltage thereto, and all SCR's are inhibited except the one that is intended to receive the operating pulse from the input oscillator.

It will be recalled that in the shift register of FIG. 1 six SCR's are employed to obtain on and off signals for 60 degree firing especially adapted for operating the three positive and the three negative controllable legs of a three-phase inverter circuit. Such control would cause the inverter to provide a three-phase output voltage, each phase being a square wave having 60 degrees dwell on either side of 120 degrees conduction as shown in the aforementioned copending application.

This modification employing twelve SCR's affords on and off signals for 30 degree firing of a more complicated inverter to provide a three-phase output voltage, each phase being a staircase wave having 30 degrees dwell on either side of 150 degrees two-step conduction.

As shown in FIGS. 3*a* and 3*b*, the modified shift register is supplied from a positive 10 volt source at conductor P and grounded conductor G. The circuit is provided with a single input terminal V*in* connectable to an oscillator as in FIG. 1 and twelve pairs of output conductors 41 through 52. The shift register comprises twelve SCR's designated SCR11 through SCR22. The anodes of these SCR's are supplied from a unidirectional voltage source at conductor P through halves of center-tapped primary windings of output transformers TR1A, TR1B, TR3A, TR3B, TR2A and TR2B. As shown in FIG. 3*a* transformer TR1A is provided with a center-tapped primary winding comprising windings P*a* and P*b* and a pair of secondary windings S*a* and S*b*. The other five output transformers are provided with similar windings. The dots adjacent the transformer windings indicate the polarity of the voltage on each winding. For example, when SCR11 conducts, current flow in primary winding P*a* of transformer TR1A induces a voltage in secondary winding S*a* such that the left-hand conductor of pair 41 has a positive voltage. This current flow in primary winding P*a* of transformer TR1A also induces a voltage in secondary winding S*b* such that the right-hand conductor of pair 47 is positive since windings P*a*, S*a*, P*b* and S*b* are wound side-by-side on the same magnetic core as indicated by the broken line. The windings of each of the other output transformers are similarly wound on a common core.

The cathodes of the twelve SCR's are connected to one another and then through a reverse biasing diode 53 to conductor G. Biasing voltage is supplied from conductor P through a resistor 54 at the right-hand portion of FIG. 3*b* to diode 53.

The shift register is provided with initial gating means for initiating operation of the first six SCR's when supply voltage is connected thereto. These means comprise six initial gating circuits 55–60 connected from conductor P to the gates of the first six SCR's, respectively. For this purpose, conductor P is connected through a diode 61 in its forward direction, a capacitor 62 and a resistor 63 in series to the gate of SCR11, there being a resistor 64 connected across diode 61, these elements constituting initial gating circuit 55. Initial gating circuits 56 through 60 consist of similar elements connected for transmitting a voltage pulse from conductor P to the gates of SCR12 through SCR16.

Each SCR is provided with a capacitor-diode type gating circuit for controlling the same in response to input pulses. Each such capacitor-diode circuit comprises a diode, a capacitor and a resistor. For example, the input pulse gating circuit for SCR11 comprises a diode D11, a capacitor C11 and a resistor R11. The corresponding elements of the other gating circuits are similarly designated D, C and R, each letter designation followed by the numeral of the corresponding SCR.

Input terminal V*in* is connected in parallel through the twelve gating circuits to the gates of SCR11 through SCR22. To this end, input terminal V*in* is connected through diode D11 in its forward direction and capacitor C11 in series to the gate of SCR11, resistor R11 being connected from the gate to conductor G. The other gating circuits are similarly connected between the input terminal and the gates of the other SCR's.

The capacitor-diode gating circuits are provided with dual inhibiting means for steering each input pulse to the proper SCR. For this purpose, each gating circuit is inhibited from the immediately preceding SCR and also from the sixth preceding (or sixth succeeding) SCR in their non-conducting conditions so that the gating circuit cannot receive an input pulse unless both of these SCR's are conducting. With this arrangement, as will become apparent from the following description, the gating circuit of only one SCR is uninhibited at a time, this being the SCR immediately following the six conducting SCR's. Less input signal current is required with this arrangement since the input current goes only to one SCR than would be required if the input current flowed also to gates of conducting SCR's.

As shown in FIG. 3*a*, the dual inhibiting means for SCR12 comprises a first circuit extending from the anode of SCR11 through a diode 65 in its forward direction and a resistor 66 in series to the cathode of diode D12. This dual inhibiting means comprises a second circuit extending from the anode of SCR18 through a diode 67 and resistor 66 to the cathode of diode D12. A resistor 68 is connected from the junction between diodes 65 and 67 and resistor 66 to the anode of diode 53 to provide a discharge current path for capacitor C12.

In a similar manner, SCR13 is provided with diodes 69 and 70 and a resistor 71 forming inhibiting circuits connected to the anodes of SCR12 and SCR19. And a resistor 72 is provided to form a discharge current path for capacitor C13. The remaining SCR's are provided with similarly connected diodes 73 and 74, 77 and 78, 81 and 82, 85 and 86, 89 and 90, 93 and 94, 97 and 98, 101 and 102, 105 and 106, 109 and 110 and similarly connected resistors 75, 79, 83, 87, 91, 95, 99, 103, 107 and 111 forming dual inhibiting circuits. These remaining SCR's are also provided with similarly connected resistors 76, 80, 84, 88, 92, 96, 100, 104, 108 and 112 forming discharge current paths for the capacitors in the respective capacitor-diode gating circuits.

The shift register is also provided with commutation control means, that is, means whereby one SCR is turned off in response to firing of another SCR whereby to control conduction of the SCR's in a predetermined order. For this purpose, the anode of SCR11 is connected through a small resistor 113 and a commutating capacitor 114 in series to the anode of SCR17. In a similar manner, the anodes of SCR12 and SCR18 are connected through a small resistor 115 and a capacitor 116, the anodes of SCR13 and SCR19 are connected through a resistor 117 and a capacitor 118, the anodes of SCR14 and SCR20 are connected through a resistor 119 and a capacitor 120, the anodes of SCR15 and SCR21 are connected through a resistor 121 and a capacitor 122, and the anodes of SCR116 and SCR122 are connected through a resistor 123 and a capacitor 124. Suitable resistors, not shown, may be connected across the primary windings of a output transformers as shown in FIG. 1 to improve the wave shape of the output voltages.

The operation of the system of FIGS. 3*a–b* will now be described with reference to the curves shown in FIG. 4.

Application of positive 10 volts across conductor P and ground conductor G causes a positive going 10 volt pulse to be applied through initial gating circuits 55 through 60 to the gates of SCR11 through SCR16 to fire these SCR's into their conducting state. As a result, current flows from conductor P through primary winding P*a* of transformer TR1A, SCR11 and diode 53 to conductor G. This current induces a voltage of one polarity in secondary winding S*a* of transformer TR1A to provide an operating output voltage at output terminals 41 as shown in FIG. 4. This current flow is primary winding P*a* also includes a voltage of the opposite polarity in secondary winding S*b* of transformer TR1A to provide a bias voltage at output terminals 47 as shown by curve 47 in FIG. 4.

In a similar manner, operating output voltages 42 through 46 appear at the correspondingly numbered output terminals when the associated SCR's are initially fired. Also, negative bias voltages 48 through 52 appear at the correspondingly numbered output terminals.

Current also flows from conductor P through resistor 54 in FIG. 3*b* and diode 53 in FIG. 3*a* to conductor G. The voltage drop across diode 53 reverse biases the gate-cathode circuits of the SCR's to prevent SCR17 through SCR22 from being fired in response to connection of supply voltage.

Following the initial firing of the first six SCR's, all of the SCR's are inhibited to input signals except SCR17, this being the SCR which should be fired by the first input pulse. To this end, positive voltages are applied from the anodes of SCR17 and SCR22 through diodes 110 and 109, respectively, and then through resistor 111 to block diode D11 so that an input voltage pulse will not pass therethrough to the gate of SCR11. Inhibiting voltage is applied from the anode of SCR18 through diode 67 and resistor 66 to block diode D12 so that an input pulse cannot pass therethrough to the gate of SCR12. Inhibiting voltages are similarly applied from the anodes of SCR19 through SCR22 to the capacitor-diode gating circuits of SCR13 through SCR16, respectively. From the foregoing, it will be apparent that the first input pulse cannot fire any of the first six SCR's which are conducting. Nonconducting SCR18 through SCR22 are also inhibited by positive voltages applied from the anodes of SCR17 through SCR21, respectively.

SCR17 alone is not inhibited. Since SCR11 and SCR16 are conducting, the anodes thereof are near ground potential. This near ground potential is applied from the anode of SCR11 through diode 86 and resistor 87 to the cathode of diode D17. This near ground potential is applied from the anode of SCR16 through diode 85 and resistor 87 to the cathode of diode D17. Thus, both inhibiting voltages having been removed from the capacitor-diode gating circuit of SCR17, the first input pulse will pass from terminal V*in* through diode D17 and capacitor C17 to the gate of SCR17 to fire this SCR.

It will be apparent that commutating capacitors 114, 116, 118, 120, 122 and 124 were charged when SCR11 through SCR16 were initially fired. For this purpose, current flow from conductor P through primary winding P*b* of transformer TR1A, capacitor 114, resistor 113, SCR11 and diode 53 to conductor G charged capacitor 114 to a polarity of positive 10 volts on its right side and near ground potential in its left side. Commutating capacitors 116, 118, 120, 122 and 124 were likewise charged to similar polarity.

Now, the firing of SCR17 by the first input pulse as aforesaid causes current flow through primary winding P*b* of transformer TR1A to produce positive voltage 47 shown in FIG. 4 at output terminal 47.

Firing of SCR17 as aforesaid causes commutation, that is, causes SCR11 to stop conducting so that six SCR's always remain conducting. This is done by capacitor 114. When SCR17 fires, its anode voltage suddenly drops from positive 10 volts to near ground potential. Since capacitor 114 cannot discharge instantaneously, the 10 volt sudden drop on its right side causes the voltage on its left side to drop from near ground potential to a negative value. Application of this negative voltage to the anode of SCR11 while its cathode is connected through diode 53 to grounded conductor G reverse biases the anode-cathode circuit to turn SCR11 off. When SCR11 turns off, the aforementioned current flow in primary winding P*b* of transformer TR1A induces a negative voltage in secondary winding S*a* which appears at output conductors 41. Capacitor 114 then discharges and charges to the opposite polarity by current flow from conductor P through primary winding P*a* of transformer TR1A, resistor 113, capacitor 114, SCR17 and diode 53 to conductor G.

When SCR17 is rendered conducting as aforesaid, it removes the positive, inhibiting voltage from the capacitor-diode gating circuit of SCR18 since near ground potential is now connected from the anode of SCR17 through diode 89 and resistor 91 to the cathode of diode D18.

When SCR11 is turned off as aforesaid, inhibiting voltage is applied from its anode through diode 86 and resistor 87 to the cathode of diode D17 to prevent the next input pulse from going to the gate of SCR17.

Since SCR18 is the only one that is not inhibited, the second input pulse fires this SCR and turns off SCR12 by the action of commutating capacitor 116 in the same manner as hereinbefore described. The succeeding input pulses then fire SCR19, SCR20, etc. one at a time and cause SCR13, SCR14, etc. to be turned off, respectively, so that the six SCR's always remain conducting.

As shown in FIG. 4, output voltages 41, 45 and 49 are displaced from one another by 120 degrees and voltages 41 through 46 are displaced by 180 degrees, respectively, from voltages 47 through 52 whereby the shift register can be used for controlling a three-phase, 30 degree firing inverter or the like.

A comparison of the circuit in FIGS. 3*a* and 3*b* with the circuit in FIG. 1 will indicate that the invention contemplates the use of any desired even number of SCR's in the shift register although either six or a multiple of six SCR's are necessary when it is used for firing a three-phase inverter. A number of commutating capacitors equal to one-half the SCR's is required and they are connected as disclosed to always maintain half the SCR's conducting. While FIG. 1 shows only one initial firing circuit to reduce the number of components required, it will be apparent that three SCR's could be fired in FIG. 1 if desired in the manner taught in FIGS. 3*a* and 3*b* if the proper additions were made. Also, these features of initially firing either one SCR or one-half the SCR's can be used with any even number of SCR's. The dual inhibiting feature shown in FIGS. 3*a* and 3*b* could also be used in the system of FIG. 1 with the proper addition of components. However, with single inhibiting in FIG. 1, current is drawn from the oscillator only to a maximum of three SCR gates so that this might not unduly overload the oscillator. But where a larger number of SCR's are used as in FIGS. 3*a* and 3*b*, dual inhibiting is more useful since otherwise the input oscillator would have to supply input current pulses to a larger number of SCR gates. Dual inhibiting restricts the input current pulse to a single SCR gate.

While the systems hereinbefore described are effectively adapted to fulfill the objects stated, it is to be understood that I do not intend to confine my invention to the particular preferred embodiments of pulse registering and shifting systems disclosed, inasmuch as they are susceptible of various modifications without departing from the scope of the appended claims.

I claim:

1. A digital control system comprising:

a plurality of gating type switching devices equal to 2N where N is any whole number;

2N output signal transmitting means;

a direct voltage source for supplying current to said output signal transmitting means when the associated switching devices are gated into conduction;

initial gating means for gating at least one of said switching devices into conduction to condition the system for operation;

an input terminal for supplying input pulses to the gates of said switching devices;

steering means for directing successive input pulses to the gates of nonconducting ones of said switching devices to cause gating thereof into conduction in sequence in a ring and comprising:

inhibiting means normally maintaining the gates of said switching devices unresponsive to input pulses and being responsive to conduction of a switching device for uninhibiting the gate of the next switching device in said sequence so that it can receive the next input pulse;

and N commutating means operable in response to gating of each additional switching device while N switching devices are conducting for rendering the first one of the latter switching devices nonconducting whereby N switching devices always remain conducting and shift around the ring in response to input pulses.

2. The invention defined in claim 1, wherein said initial gating means comprises:

means responsive to connection of said direct voltage source to said system for gating N successive ones of said switching devices into conduction.

3. The invention defined in claim 1, wherein said output signal transmitting means comprises:

an output transformer for each said switching device, each transformer having a primary and a secondary winding and each secondary winding being connected to a pair of output conductors;

and means coupling the windings of the output transformers of the first and N+1, the second and N+2, etc., switching devices, respectively whereby gating of the first switching device produces a positive voltage at the first output conductor pair and a negative voltage at the N+1 output conductor pair and vice versa, and gating the second switching device produces a positive voltage at the second output conductor pair and a negative voltage at the N+2 output conductor pair and vice versa, etc.

4. The invention defined in claim 1, wherein said inhibiting means comprises:

dual inhibiting means for the gate of each switching device comprising a first circuit extending thereto from the anode of the immediately preceding switching device and a second circuit extending thereto from the anode of the Nth succeeding switching device whereby the gate of each said switching device is uninhibited only when both said immediately preceding and Nth succeeding switching devices are conducting.

5. A digital control system comprising:

a plurality of solid state controlled rectifier circuits connected to a unidirectional voltage source and each of the controlled rectifiers in said circuits having an anode and a cathode and a gate;

a plurality of gating circuits, one for each controlled rectifier, connected to the gates thereof and being operable for initiating conduction in the anode-cathode circuits of the respective controlled rectifiers;

means normally inhibiting said gating circuits and connecting said controlled rectifiers in a ring for repetitively sequential operation and being responsive to conduction of any one of said controlled rectifiers for uninhibiting the gating circuit of the succeeding controlled rectifier in the ring;

means for initially rendering one of said controlled rectifiers conducting thereby to uninhibit the gating circuit of the succeeding controlled rectifier;

means for applying input signals to said gating circuits in common to cause operation of the uninhibited gating circuit and to render the associated controlled rectifier conducting;

a plurality of output circuits, one for each controlled rectifier, for providing output signals in response to conduction of the corresponding controlled rectifiers;

and commutating means connected between the first and fourth, the second and fifth and the third and sixth controlled rectifiers responsive to firing of a fourth controlled rectifier when three are conducting for rendering nonconducting the controlled rectifier which has been conducting the longest thereby to provide three output signals at all times.

6. The invention defined in claim 5, wherein said commutating means comprises:

capacitors connected between the anodes of the first and fourth, the second and fifth and the third and sixth controlled rectifiers.

7. The invention defined in claim 5, wherein each said gating circuit comprises:

a capacitor-diode circuit having a diode connected in its forward low impedance direction in series with a capacitor from said input means to the gate of the associated controlled rectifier.

8. The invention defined in claim 7, wherein said inhibiting means comprises:

means comprising a resistor connecting a blocking voltage to the junction between the diode and capacitor in each gating circuit.

9. The invention defined in claim 8, together with:

a biasing diode connected between the cathodes of said controlled rectifiers and one side of said source supplied through a resistor from the other side of said source to prevent undesired firing of said controlled rectifiers.

10. The invention defined in claim 5, wherein said means for initially rendering one of said controlled rectifiers conducting comprises:

a pulsing circuit responsive to application of supply voltage to said controlled rectifier circuits for applying a current pulse to the gate of said one controlled rectifier.

11. The invention defined in claim 5, wherein said means for applying input signals to said gating circuits comprises:

a relaxation oscillator responsive to an adjustable D.C. voltage for applying input pulses of proportionally adjustable frequency to said gating circuits.

12. The invention defined in claim 5, wherein each said output circuit comprises:

one-half of a center-tapped primary winding of a transformer connected between said voltage source and the anode of the respective controlled rectifier and a secondary winding connected to output terminals, there being three transformers for the first and fourth, the second and fifth, and the third and sixth outputs.

13. A pulse registering and shifting system comprising:

an electrical power supply source;

a plurality of controllable solid state electronic devices;

means connecting said electronic devices across said source;

a plurality of outputs connected to said connecting means, there being one output for each solid state electronic device whereby current flow in the latter produces an output signal at the respective output;

a plurality of control circuits connected for controlling the respective solid state electronic devices;

means for connecting said solid state electronic devices in an operational ring comprising coupling means connecting each solid state electronic device to the control circuit of the immediately succeeding solid state electronic device for applying an inhibiting voltage to such control circuit whenever the preceding solid state electronic device is not conducting thereby to prevent firing of the immediately succeeding solid state electronic device;

means for firing one of said solid state electronic devices independently of its inhibited control circuit thereby to render it conducting;

said coupling means being responsive to conduction in said one solid state electronic device for removing the inhibiting voltage from the control circuit of the immediately succeeding solid state electronic device whereby to condition the latter for response to an input pulse;

means for applying input pulses to the control circuits of all solid state electronic devices in common whereby successive input pulses render successive solid state electronic devices conducting;

and commutating means coupling said solid state electronic devices to allow three of them to conduct at one time and being responsive when an input pulse renders a fourth electronic device conducting to render nonconducting the electronic device which has been conducting the longest.

14. In combination with a ring counter comprising six controllable semi-conductor devices connected in sequence by inhibiting circuits and which are rendered conducting in succession by input pulses received at a single input terminal; the improvement comprising:

commutating capacitors connected between the first and fourth, the second and fifth and the third and sixth of the sequentially connected semiconductor devices to prevent more than three thereof conducting at one time and to insure conduction of three successive semi-conductor devices at all times thereby to convert a single series of input pulses into a three-phase square-wave electrical output wherein the pulses of each phase are 180 degrees long and spaced 180 degrees and the pulses of the different phases are displaced 120 degrees.

15. A modified ring counter comprising:
a plurality of solid state gating type switching devices equal to 2N where N is any whole number;
2N output signal transmitting means;
a direct voltage source and means for applying it to supply current to said output signal transmitting means when the associated switching devices are gated into conduction;
initial gating means for gating at least one of said switching devices into conduction to condition the system for operation;
an input terminal for receiving input pulses for the gates of said switching devices;
steering means for passing each successive input pulse from said input terminal only to the gate of the nonconducting switching device immediately following the last conducting switching device to cause gating of said switching devices into conduction in sequence in a ring and comprising:
inhibiting means normally applying two inhibiting voltages to prevent input pulses from passing to the gate of each switching device and being responsive to conduction of each said switching device for removing one of said inhibiting voltages from the immediately succeeding switching device and from the Nth succeeding switching device thereby to allow the next input pulse to pass to the gate of only the first nonconducting switching device which follows the last conducting switching device;
and N commutating means operable in response to gating of each additional switching device while N switching devices are conducting for rendering the first one of the latter switching devices nonconducting whereby N switching devices always remain conducting and shift around the ring in response to input pulses.

16. The invention defined in claim 15, wherein said initial gating means comprises:
means responsive to connection of said direct voltage source to said counter for gating a plurality of said switching devices into conduction.

References Cited

UNITED STATES PATENTS

| | | | |
|---|---|---|---|
| 2,953,735 | 9/1960 | Schmidt | 321—5 |
| 3,091,729 | 7/1939 | Schmidt | 321—5 |
| 2,165,041 | 7/1939 | Filberich et al. | 315—340 X |
| 3,049,642 | 8/1962 | Quinn. | |
| 3,249,842 | 5/1966 | Murphy | 321—5 |

OTHER REFERENCES

G.E. Co., SCR Manual, 2nd ed. Sec. 7.12, pp. 109, 110, 1961.

JOHN F. COUCH, *Primary Examiner.*

W. H. BEHA, *Assistant Examiner.*